United States Patent [19]
Brown

[11] 3,780,883
[45] Dec. 25, 1973

[54] PIPE HANDLING SYSTEM FOR USE IN WELL DRILLING

[76] Inventor: Cicero C. Brown, c/o Brown Oil Tools, Inc., P.O. Box 19236, Houston, Tex. 77024

[22] Filed: July 25, 1972

[21] Appl. No.: 275,024

Related U.S. Application Data

[62] Division of Ser. No. 125,740, March 18, 1971, Pat. No. 3,706,347.

[52] U.S. Cl. .................. 214/2.5, 214/1 P, 175/85, 221/251
[51] Int. Cl. ............................................. E21b 19/14
[58] Field of Search ............... 214/1 P, 1 PA, 1 PB, 214/2.5; 175/52, 85; 221/251, 295

[56] References Cited
UNITED STATES PATENTS

| 3,254,776 | 6/1966 | Brown | 214/2.5 |
| 2,656,052 | 10/1953 | Tucker | 214/2.5 |
| 2,643,006 | 6/1953 | King | 214/2.5 |
| 3,053,401 | 9/1962 | Jinkins, Jr. | 214/2.5 |
| 2,900,091 | 8/1959 | Minter | 214/2.5 |

Primary Examiner—Frank L. Werner
Attorney—Michael P. Breston

[57] ABSTRACT

A pipe handling system for use in well drilling. The system includes pipe storage racks, power-operated conveyor means for advancing the pipe sections to a drilling derrick and for transferring the pipe sections from the storage racks to the conveyor means; power swivel means supported by the derrick hoist adapted for connection to the pipe sections, and power-actuated pivoting means connecting the power swivel means to the hoist to enable angular movement of the swivel means as required to effect alignment thereof with the forward ends of the pipe sections entering the derrick from the conveyor means.

4 Claims, 29 Drawing Figures

PIPE HANDLING SYSTEM FOR USE IN WELL DRILLING

This is a division of application Ser. No. 125,740, filed Mar. 18, 1971 now U.S. Pat. No. 3,736,347.

BACKGROUND OF THE INVENTION

In the rotary drilling of oil and gas wells, the drilling string is made up of pipe sections, commonly stored at one side of the derrick floor, by picking up the sections individually by conventional hoist means mounted in the derrick and screwing them successively into the string of pipe already suspended in the well bore. In withdrawing the drilling string the procedure is reversed, the pipe sections or stands being broken out as the string is withdrawn from the well and returned to the storage rack. Conventionally, these operations require considerable manual labor and expenditure of time in making socalled "round-trips."

DESCRIPTION OF THE INVENTION

The present invention is directed to improvements in pipe handling systems for well drilling which embody power-operated means for transferring the pipe sections from the storage racks to the derrick; a power-operated swivel supported by the derrick hoist means for moving the pipe sections into and out of connection with the drilling string and for rotating the same. The various power-operated elements of the system are arranged to be made largely automatic, thereby greatly reducing much of the manual effort as well as the time and expense ordinarily required.

The invention is particularly adapted for use with drilling systems employing relatively large diameter casing as the drill pipe, where the diameter of the casing ordinarily precludes stacking of the stands vertically inside the derrick and requires that the stands be laid horizontally on storage racks at one side of the derrick. Some casing drilling systems to which the present invention is particularly adaptable are disclosed in my U. S. Pat. Nos. 3,552,507, 3,552,508, 3,552,509 and 3,552,510.

In accordance with a preferred embodiment, the invention contemplates a pair of storage racks for the pipe stands or sections disposed in parallel on opposite sides of a pivotally mounted elongate conveyor unit tiltable from side to side to receive pipe sections transferred alternately from the storage racks in an automatic manner. The conveyor unit is provided with power-operated endless-belt means for advancing the pipe sections to the well derrick. The latter carries a conventional hoist system including crown and travelling blocks. The travelling block supports a power-operated swivel carrying a suitable pipe-connector element. The swivel is pivotally mounted to the travelling block and connected thereto by powered piston-cylinder means to enable angular movement of the swivel and the connector element for alignment with and connection to the pipe sections entering the derrick from the conveyor unit. A suitably disposed pipe clamp, either manual or power-operated, is arranged to grip the pipe sections entering or leaving the derrick to act as a back-up while the pipe connector element is connected to or disconnected from the pipe sections as may be required in operation of the system. The system may include auxiliary pipe storage racks located alongside the primary storage racks and provided with power-operated means for transferring pipe sections between the auxiliary and primary storage racks as may be required.

Other features and other and more specific objects and advantages of this invention will become more readily apparent from the following detailed description when read in conjunction with the accompanying drawings which illustrate useful embodiments of this invention.

Referring to the drawing, FIGS. 1 to 10 illustrate the pipe rack means for storing pipe sections P, the conveyor means C for moving the pipe sections to and from the derrick D, and the transfer means for transferring the pipe sections between the rack means and the conveyor means.

The rack means comprises a skid-mounted frame, designated generally by the numeral 10, which includes a pair of parallel spaced apart skid members 11, surmounted by a plurality of longitudinally spaced apart upright cross plates 12 extending transversely of the skids. A plurality of horizontally disposed, longitudinally spaced apart rack bars 13a, 13b, and 13c (front to rear) extend to opposite sides of the frame with their inner ends spaced apart and pivotally mounted to the upper ends of support brackets 14 (FIG. 10) which, in turn, have their lower ends pivotally mounted at 15 to the upper ends of cross plates 12. The outer ends of the several rack bars are supported from pedestals 16 for vertical adjustment by means of threaded posts 17 which are screwed into the tops of the pedestals and which support caps 18 underlying the outer ends of the rack bars. Anti-friction bearings 19 are suitably arranged between caps 18 and the upper ends of posts 17. By means of these pivoted and adjustable supports the rack bars may be tilted between positions inclined downwardly toward their inner or outer ends for purposes which will appear subsequently.

The conveyor means, designated generally by the letter C, is disposed longitudinally and centrally of frame 10 in the space between the inner ends of the rack bars and includes an elongate articulated frame member comprising a rearward conveyor support section 20 and a forward discharge section 21. The sections are pivotally connected by means (FIGS. 4B and 5) which includes a clevis 22 and cooperating lug 23 on the adjacent ends of the respective sections and a pivot pin 24 extending transversely through the clevis and lug. By means of this connection forward section 21 may be angularly raised and lowered relative to conveyor section 20.

Figure 4A:
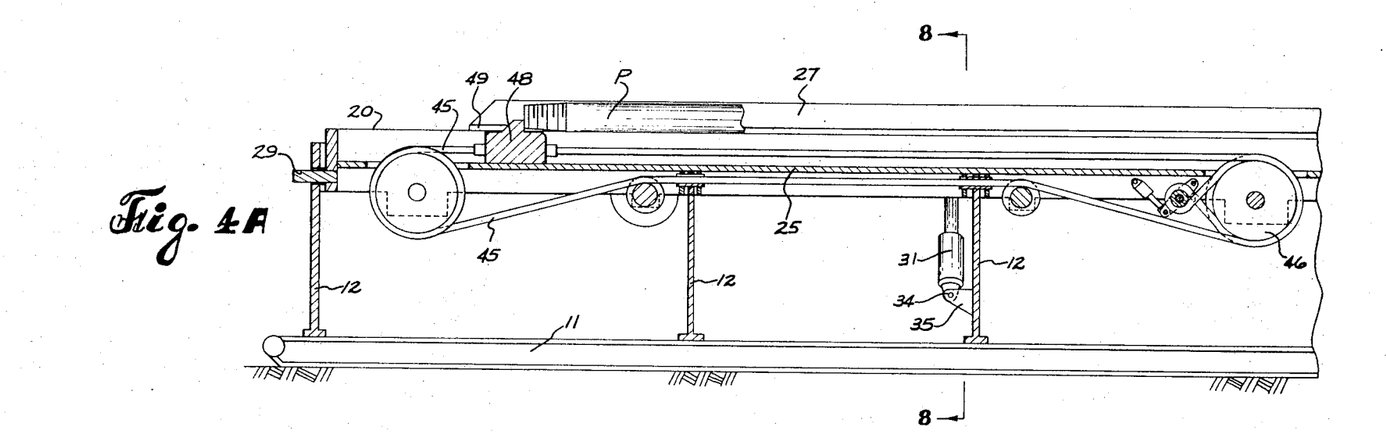
FIGS. 4A and 4B, together, comprise a side elevational view of the conveyor elements taken generally along line 4—4 of FIG. 1.
Figure 4B:
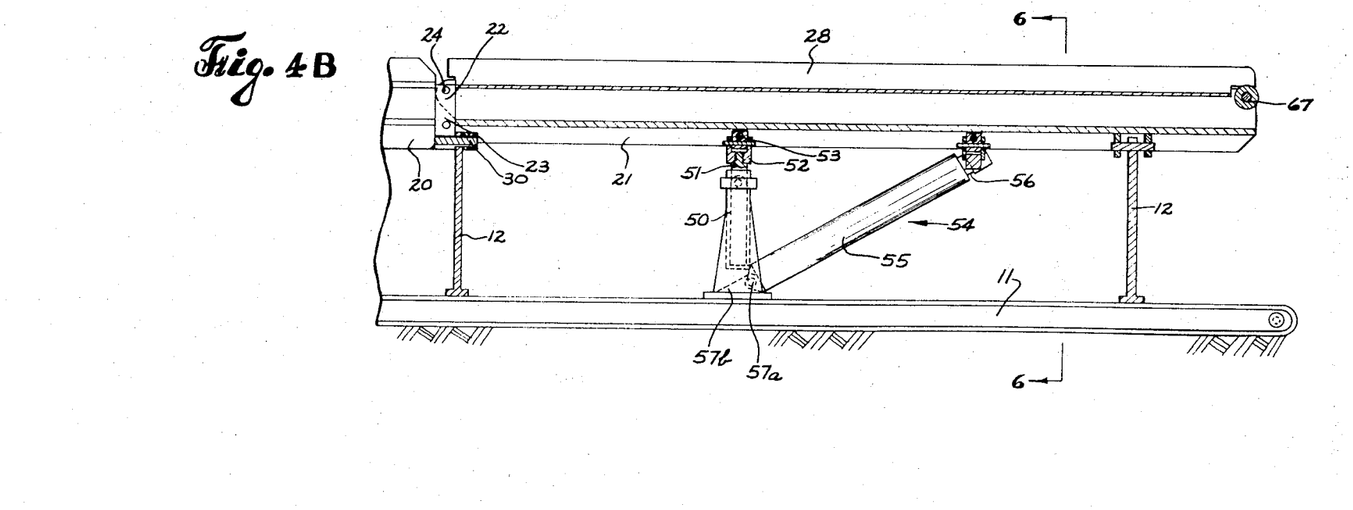
Figure 5:
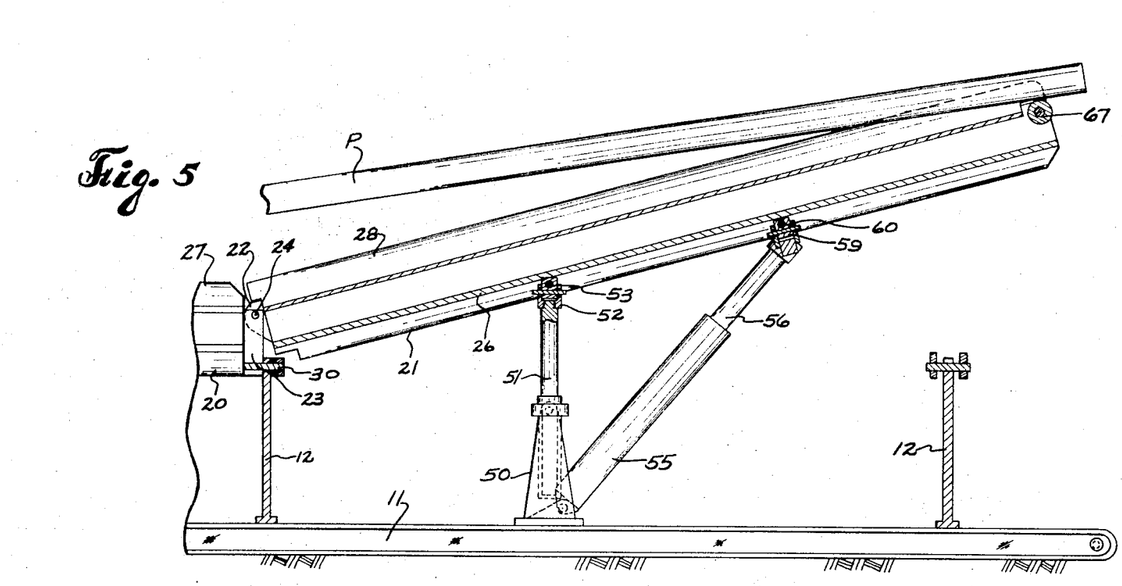
FIG. 5 is a side elevational view of the forward articulated section of the conveyor system taken generally on line 5—5 of FIG. 3.
Figure 6:
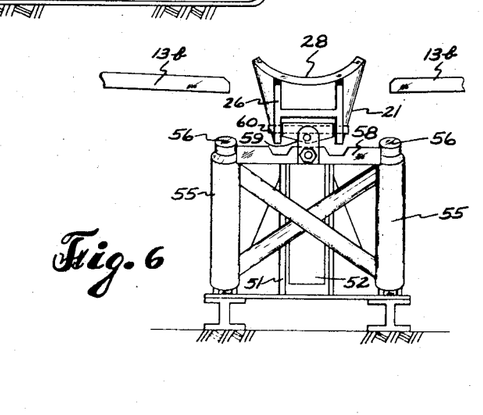
FIG. 6 is a cross-sectional view taken on line 6—6 of FIG. 4B, showing the forward section of pipe-receiving cradle of the conveyor system in vertical position.
Figure 7:
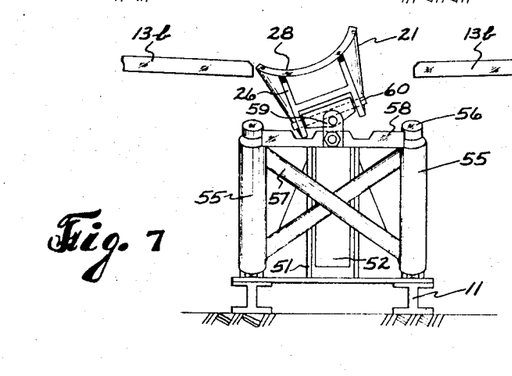
FIG. 7 is a view similar to FIG. 6 showing the cradle tilted toward one of the pipe racks.

As best seen in FIGS. 6 to 9, inclusive, each of the sections 20 and 21 is fabricated from H-beam members 25 and 26, respectively, on which are mounted downwardly curved arcuate cradles 27 and 28, respectively, which are adapted to receive pipe sections P from the pipe rack means located along opposite sides of the conveyor means. Conveyor section 20 is provided at its opposite ends with stub shafts 29 and 30 which are journalled in appropriate ones of cross plates 12 to permit rocking or tilting movement of section 20 about its longitudinal axis. By means of the connection provided by clevis 22 and lug 23 between sections 20 and 21 both sections will rock in unison when section 21 is in the horizontal position, as seen in FIGS. 4B, 6 and 7.

Figure 8:
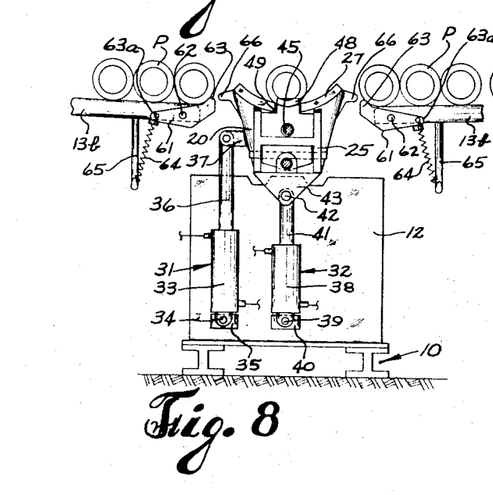
FIGS. 8 and 9 are cross-sectional views taken on line 8—8 of FIG. 4A showing the upright and tilted positions, respectively, of the rearward section of the transfer and conveyor system.
Figure 9:
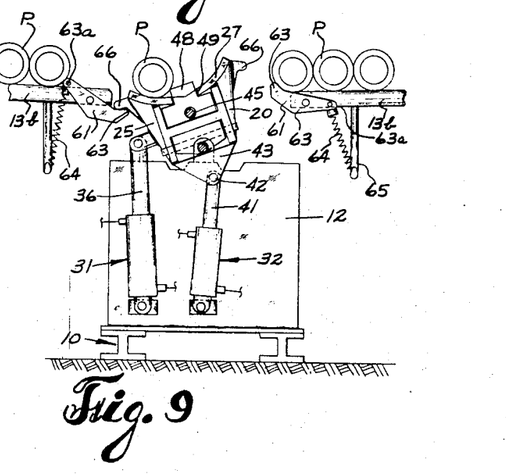

Rocking of section 20 for transferring pipe sections between the pipe racks and the cradles is effected by means of fluid pressure-actuated jacks 31 and 32, as best seen in FIGS. 8 and 9. Jack 31 functions as the tilting jack and jack 32 as the centering jack. Jack 31 comprises a cylinder 33 hingedly secured at 34 to a lug 35 attached to a cross plate 12 and a piston 36 connected by a pivoted link 37 to one side of section 20. centering jack 32 comprises a cylinder 38 hingedly secured at 39 to a lug 40 attached to cross plate 12 and a piston 41 pivotally connected at 42 to a centering lug 43 secured to the bottom of H-beam member 25. By appropriate direction of pressure fluid to jack 31, section 20 may be tilted toward either the right hand rack or the left-hand rack (FIG. 9), as may be desired, while jack 32 may be appropriately actuated to hold the conveyor section in the upright or centered position after receiving a pipe section (FIG. 8).

Figure 1:
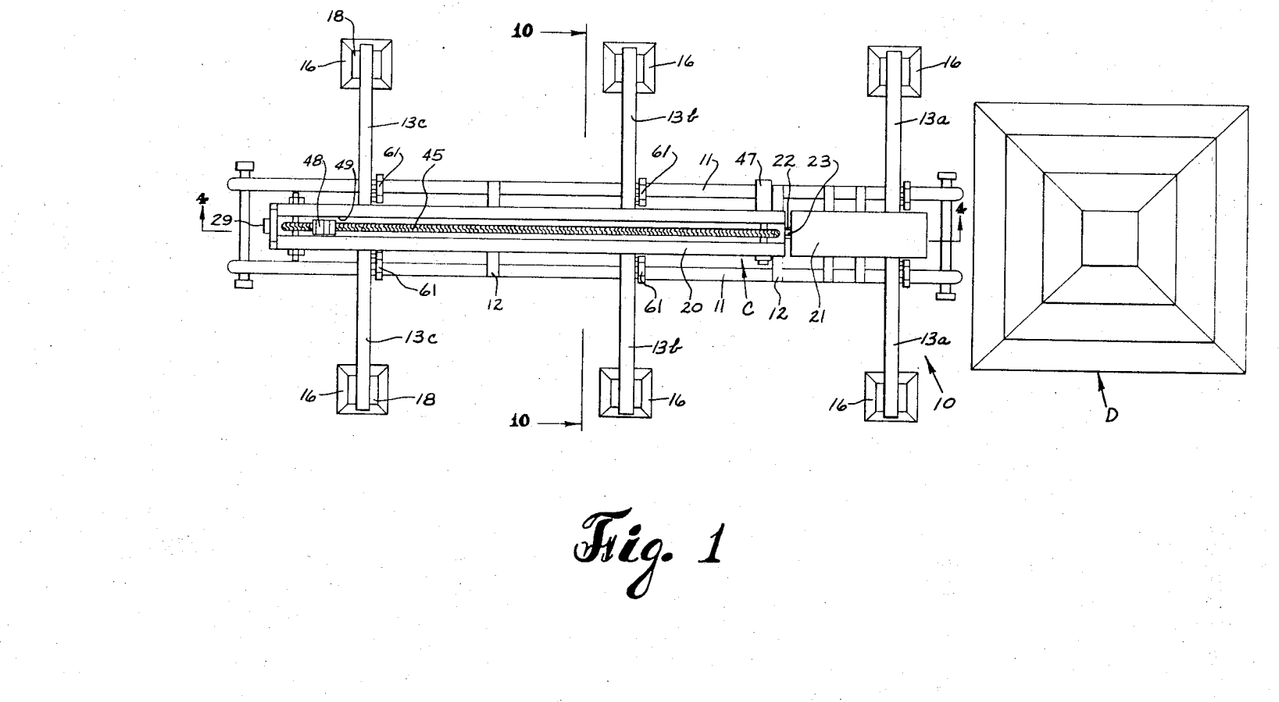
FIG. 1 is a plan view of a pair of empty pipe storage racks and the conveyor system disposed between them in position adjacent a drilling derrick.

Conveyor section 20 is provided with an endless cable 45 (FIG. 4A) which is trained over a plurality of suitably positioned idler and tensioning pulleys, including a drive pulley 46 connected to a conventional reversible motor 47 (FIG. 1) which may be driven by air, hydraulic fluid, or electricity. A pusher lug 48 is mounted on cable 45 for reciprocating sliding movement in a longitudinal slot 49 provided in the bottom of cradle 27 (FIGS. 1, 8 and 9).

A jack 50 (FIGS. 4B to 7, inclusive) is positioned beneath the center of forward section 21 intermediate its ends and the upper end of its piston 51 is secured by a pivot link 52 to a cross pivot 53 carried between the bottom flanges of H-beam 26. A pair of forwardly extending idler jacks 54, each comprising a cylinder 55 and a piston 56, are positioned on opposite sides forward section 21. The cylinders are rigidly connected by cross-bracking 57 and have their ends pivotally secured at 57a to floor lugs 57b attached to skid members 11. The upper ends of pistons 56 are connected by a crosshead 58 which extends transversely of section 20 forwardly of jack 50. The center of crosshead 58 is also linked by a pivoted link 59 and a cross-pivot 60 to the bottom of H-beam 26. While jack 50 functions to raise and lower forward section 21, as required, idler jacks 54 provide stabilizing support for the forward end portion of this section as it is raised and lowered in the course of operation. The double-pivoted linkages to section 21 of piston 51 and cross-head 58 enable forward section 21 to be rocked from side to side in concert with rearward section 20, as when receiving pipe sections from the pipe racks or when returning pipe sections to the racks, as will be described subsequently. Also the transverse pivots accommodate the raising and lowering movements of section 21 about pivot pin 24.

Figure 10:
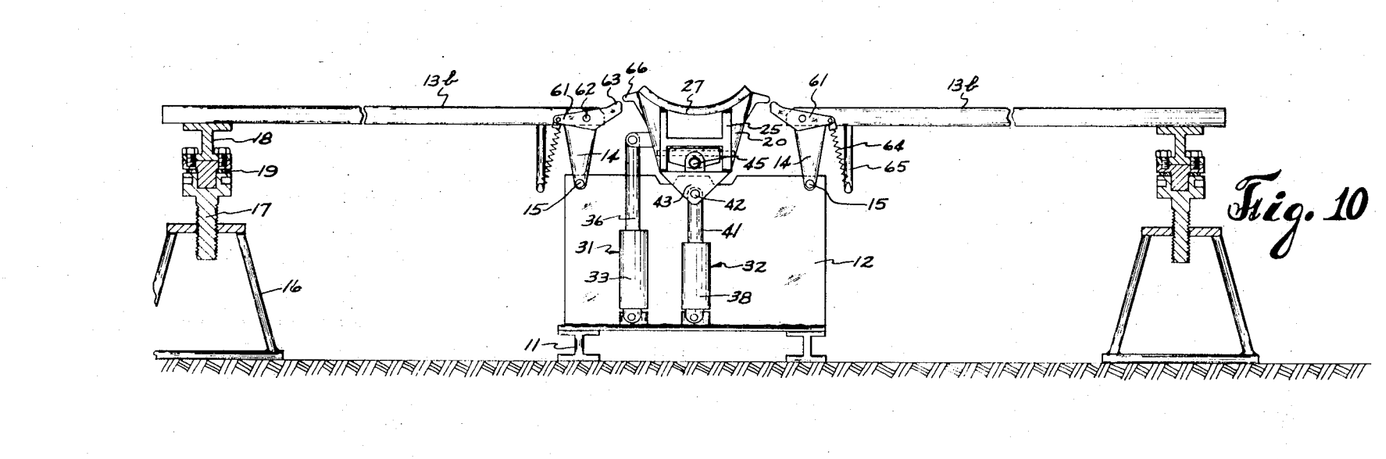
FIG. 10 is a transverse cross-sectional view taken on line 10—10 of FIG. 1.
Figures 10A, 11:
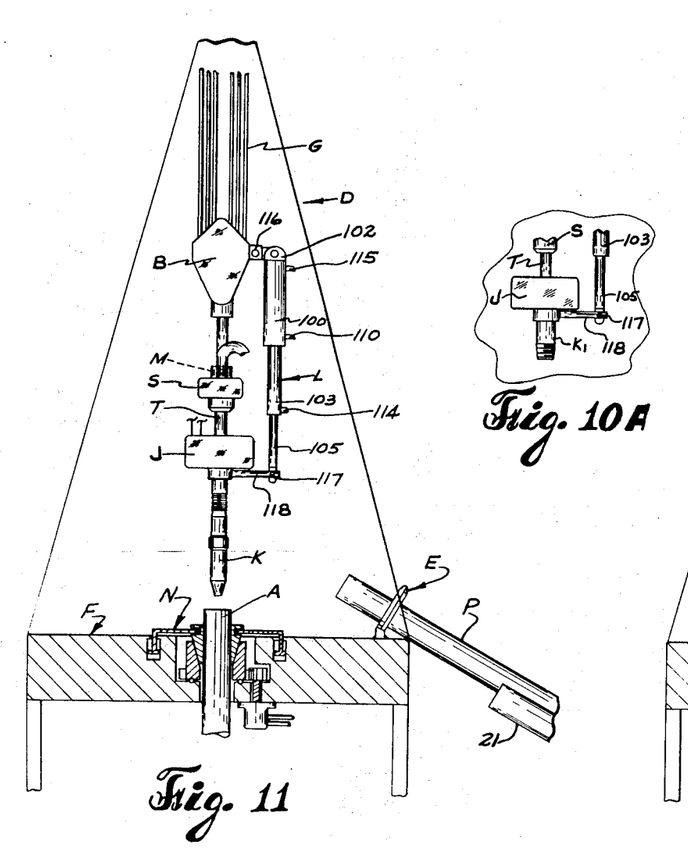
FIG. 10A illustrates a detail of a modification of the system.
FIGS. 11, 12, 13 and 14 are views partly in elevation and partly in section illustrating steps in the procedures for picking up a pipe section entering the derrick from the pipe rack with the power swivel carried by the derrick hoist and making it up into the drilling string.

The mechanism for transferring sections of pipe P between the pipe racks and conveyor means C is best seen in FIGS. 8, 9 and 10. The mechanism includes a detent 61 pivotally mounted to the inner end of each of the rack bars 13b and 13c (only one shown). The forward end of each detent is formed with an upwardly curving lip 63 and the rearward end 63a of the detent is connected by a spring 64 to an arm 65 extending downwardly from the rack bar. Spring 64 normally urges lip 63 upwardly into the path of movement of the pipe sections P to hold the pipe sections in place until the detent is depressed. Rearward conveyor section 20 is provided on each side thereof at points opposite the several detents 61 with laterally projecting fingers or pawls 66 constructed and arranged to effect downward engagement with the respective lips 63 when the conveyor section is tilted to one side or the other, as best seen in FIG. 9 and to depress lips 63 out of the path of movement of the innermost pipe section P which is turn freed to roll by gravity on to cradle 27, the rack bars being tilted downwardly toward the conveyor section by appropriate adjustment of posts 17. Simultaneously, the rearward ends 63a of the detents are rotated upwardly into the path of movement of the next section of pipe P to thereby prevent that next section and the other pipe sections behind it on the rack from rolling forward until conveyor section 20 has been returned to its centered or upright position (FIGS. 8 and 10) at which pawls 66 will have been rocked out of engagement with lips 63. Springs 64 will then return the detents to the positions shown in FIGS. 8 and 10 allowing the next pipe section P to roll forward against lips 63 in position for transfer to the cradle. By suitable operation of jacks 31 and 32 successive sections of pipe P may be transferred to the conveyor means either alternately from the pipe racks on opposite sides of the conveyor means or successively from one or the other of the pipe racks.

As each pipe section is received on the conveyor means, pusher lug 48 will be in the retracted position on conveyor section 20 (FIGS. 2 and 4A) to engage the rearward end of the pipe section whereupon actuation of motor 47 will cause lug 48 to push the pipe section forwardly over discharge section 21 which will be raised upwardly by means of jack 51 to direct the forward end of the pipe section toward the floor of derrick D for further movement, as will be more fully described hereinafter.

As pusher lug 48 pushes pipe section P forwardly, jack 51 is activated to raise forward conveyor section 21 upwardly to direct the forward end of the pipe section into derrick D above the level of the derrick floor (FIGS. 5 and 11 to 13), the forward end of the pipe section passing over a transverse roller 67 carried by the forward end of conveyor section 21.

Referring now to FIGS. 11 to 14, a split clamp, designated generally by the letter E, is shown mounted on the floor F of derrick D for alignment with the forward end of pipe section P being discharged from forward conveyor section 21. One embodiment of clamp E is shown in FIGS. 15, 16 and 17, and a second embodiment in FIGS. 18, 19 and 20.

Figure 15:
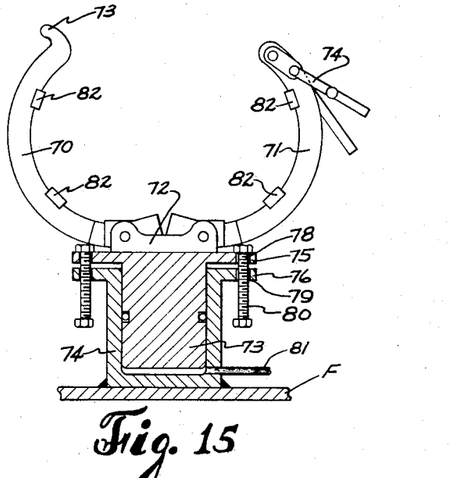
FIGS. 15, 16 and 17 are views partly in elevation and partly in vertical section of a split back-up clamp having manually operable jaws for releasably holding the pipe sections against rotation relative to the swivel connection and mounted on a power-operated pedestal for varying its elevation.
Figure 16:
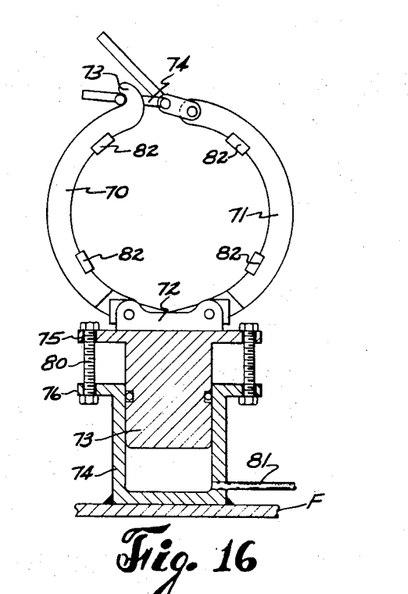
Figure 17:
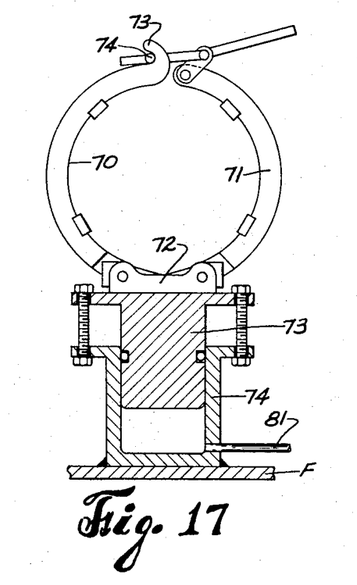

As shown in FIGS. 15 to 17, inclusive, clamp E comprises a pair of semi-circular jaws 70–71, each hingedly connected at one end to a hinge block 72 mounted on a piston 73 reciprocably received in a cylinder 74 secured firmly to derrick floor F. The piston and cylinder are provided with mating flanges 75 and 76, respectively, having registering openings 78 and 79, respectively, therethrough for the reception of elongate headed guide rods 80 which prevent relative rotation between the clamp and cylinder while permitting relative axial movement of the clamp. conduit means 81 provides fluid communication with cylinder 74 beneath piston 73 for raising and lowering the clamp for purposes of aligning the pipe sections with the derrick hoist as will appear subsequently.

Jaws 70 and 71 are fitted with pipe gripping dies 82. The free end of jaw 70 is provided with a hook 83 and the free end of jaw 71 with a hinged link 84 which is adapted to be swung over hook 83 to close the jaws about the forward or box end of a pipe section to serve as a back-up when making up a threaded member into the box of the pipe section as will be described hereinafter.

Figure 18:
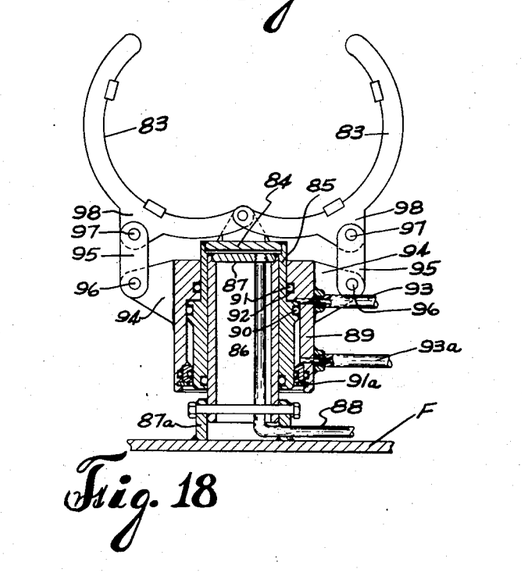
FIGS. 18, 19 and 20 are views generally similar to FIGS. 15, 16 and 17, respectively, showing a modified form of back-up clamp whose jaws are power-operated.
Figure 19:
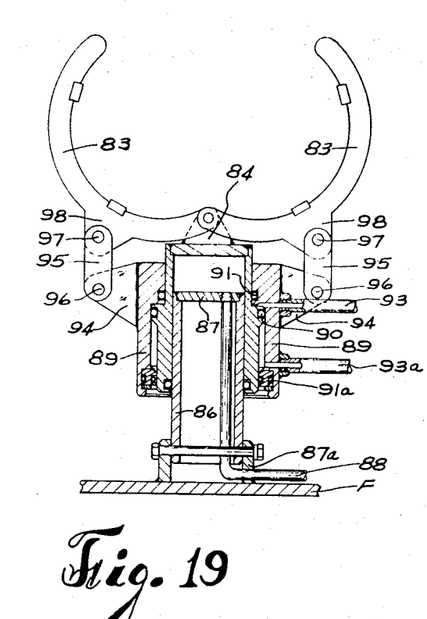
Figure 20:
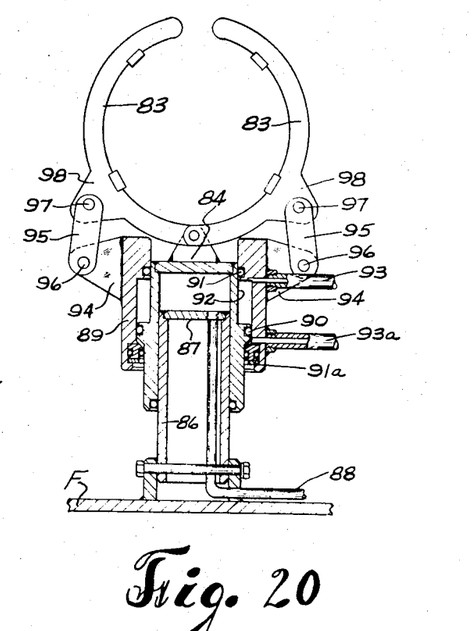

In the embodiment illustrated in FIGS. 18 to 20, inclusive, the split clamp comprises the die-carrying jaws 83—83 hingedly connected at one end to a hinge block 84 mounted on the upper end of a cylinder 85 which is reciprocable over a hollow piston 86 closed at its upper end by a head 87 and which has its lower end bolted to a pedestal 87a secured to the derrick floor F. A fluid pressure line 88 communicates through head 87 with the interior of cylinder 85 for raising and lowering the clamp as may be required.

A sleeve 89 is slidably mounted about cylinder 85 and these members are fitted with spaced seals 90–91 to define a second cylinder 92 (FIG. 20) to which is connected a line 93 for introducing and discharging fluid pressure employed to raise and lower sleeve 89 relative to cylinder 85. The lower end of sleeve 89 is provided with a seal 91a forming with seal 90 a second cylinder communicating with a fluid pressure line 93a through which fluid pressure may be introduced to reopen the clamp by returning the parts to the position shown in FIG. 19. Sleeve 89 is provided on opposite sides thereof with ears 94 to which hinge links 95–95 are connected at one end by hinge pins 96—96. The other ends of the links are hingedly connected by hinge pins 97—97 to ears 98—98 on the respective jaws 83—83.

In the embodiment illustrated in FIGS. 18 to 20, inclusive, both vertical adjustments of the clamp and opening and closing of the jaws about a pipe section thus may be accomplished by fluid pressure actuation.

Referring now to FIGS. 11 to 14, 21 and 22, the portions of the pipe-handling system are shown for moving the pipe sections, being fed to the derrick by the conveyor means C, into and out of the well drilling string A and for rotating the drilling string. These portions include the derrick-supported hoist means, designated generally by the letter H, which include a conventional travelling block B, connected by the cables G which are strung over the usual derrick crown block (not shown) under the control of the conventional drawworks (not shown). Travelling block B is pivotally connected at M to a conventional hose swivel S and conduit T, through which drilling fluids may be fed, in the well-known manner, to the drilling string for circulation through the well during drilling. Connected to conduit T below the hose swivel is a power sub or swivel J which may be of any suitable construction adapted for rotating the pipe string in the well. One such power swivel is disclosed in my U.S. Pat. No. 3,467,202. The power swivel is drivingly connected to a hollow drive connection, such as a spear K, which may be of the type disclosed conveyer my U.S. Pat. No. 3,552,507, adapted to be inserted into the bore of the upper end of a pipe section P and rotationally secured thereto by means of a nonthreaded connection. Instead of a spear-type connection such as connection K, which is preferably used when pipe sections P comprise relatively large diameter casing, as when casing is used as the drill pipe, the connection may comprise a more conventional thus pintype sub $K_i$ (FIG. 10A) which can be screwed directly into the threads of the box conventionally carried by the forward ends of pipe sections P.

Figures 21, 22:
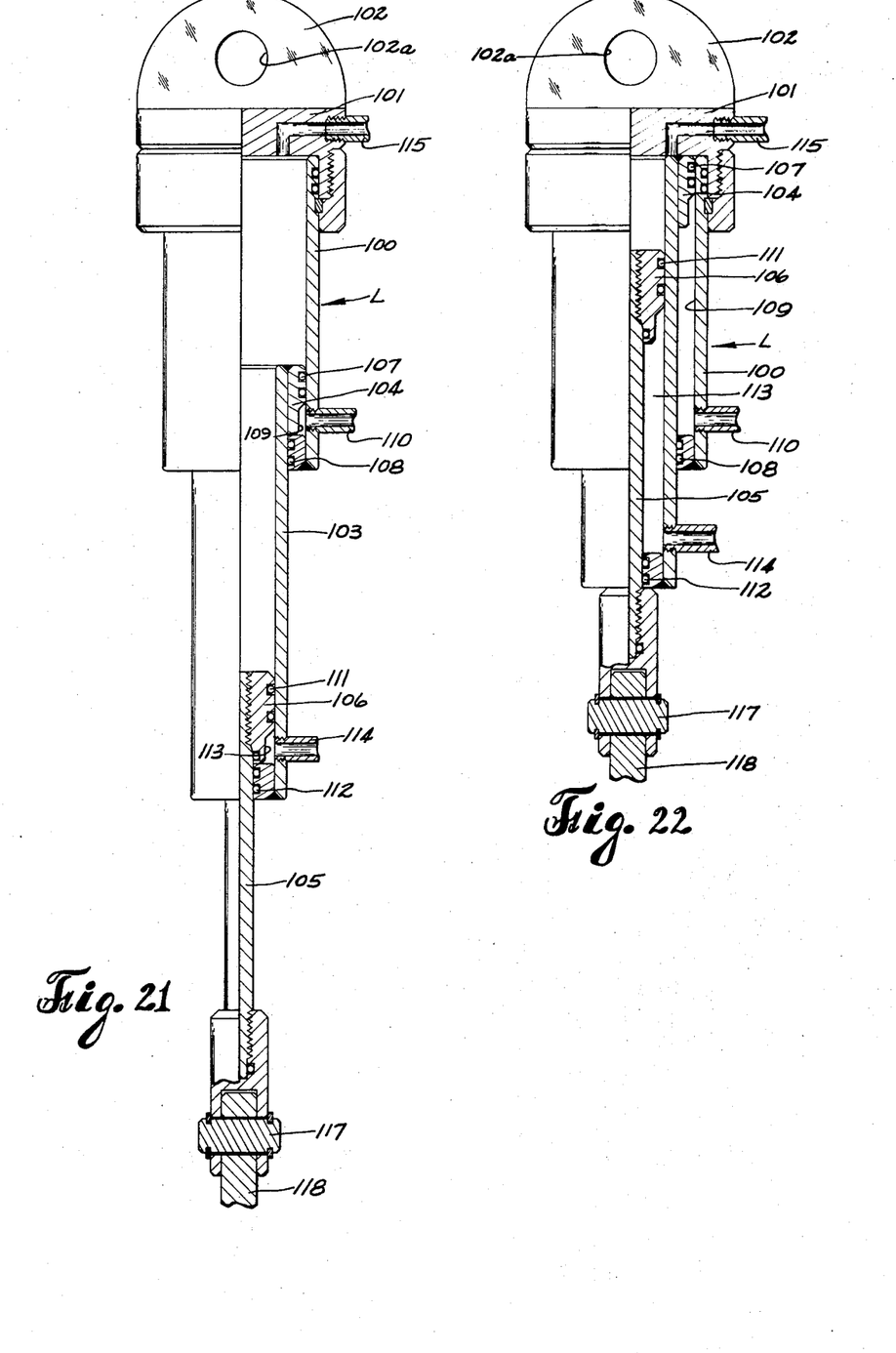
FIGS. 21 and 22 are vertical, partly sectional views of a powered pivoting linkage between the power swivel and the travelling block of the derrick hoist for aligning the power swivel with the pipe section entering the derrick.
Figure 23:
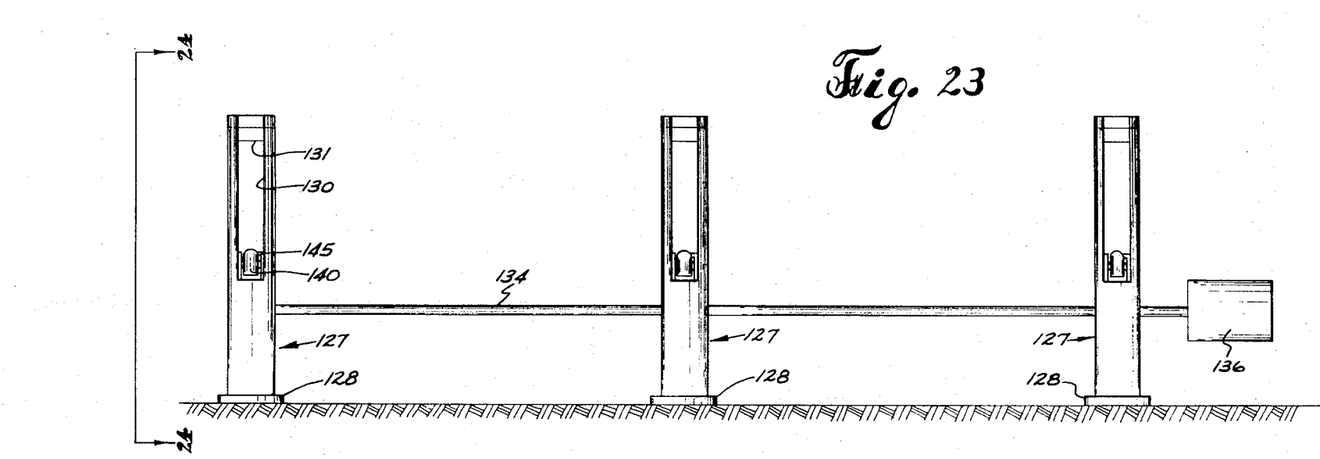
FIG. 23 is a side elevational view of an auxiliary pipe storage rack adapted to be positioned alongside one or both of the primary pipe racks shown in FIGS. 1, 2 and 3.
Figure 24:
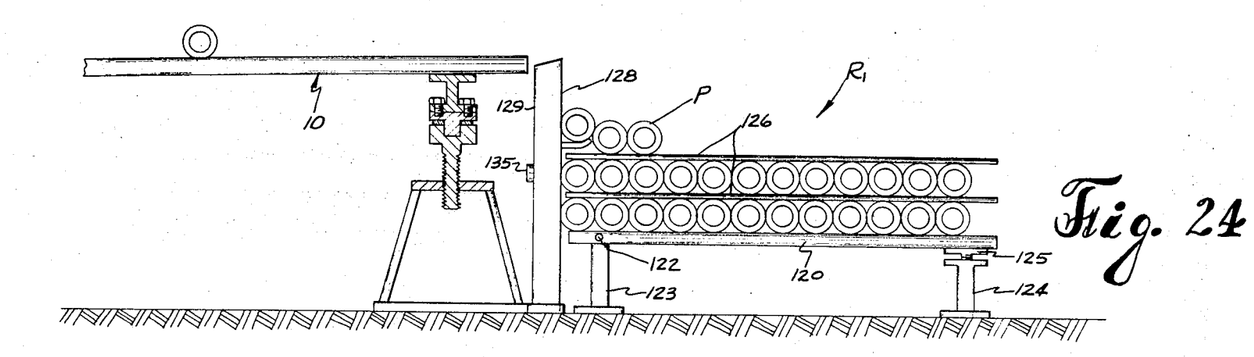
FIG. 24 is an end elevational view taken on line 24—24 of FIG. 23.
Figure 25:
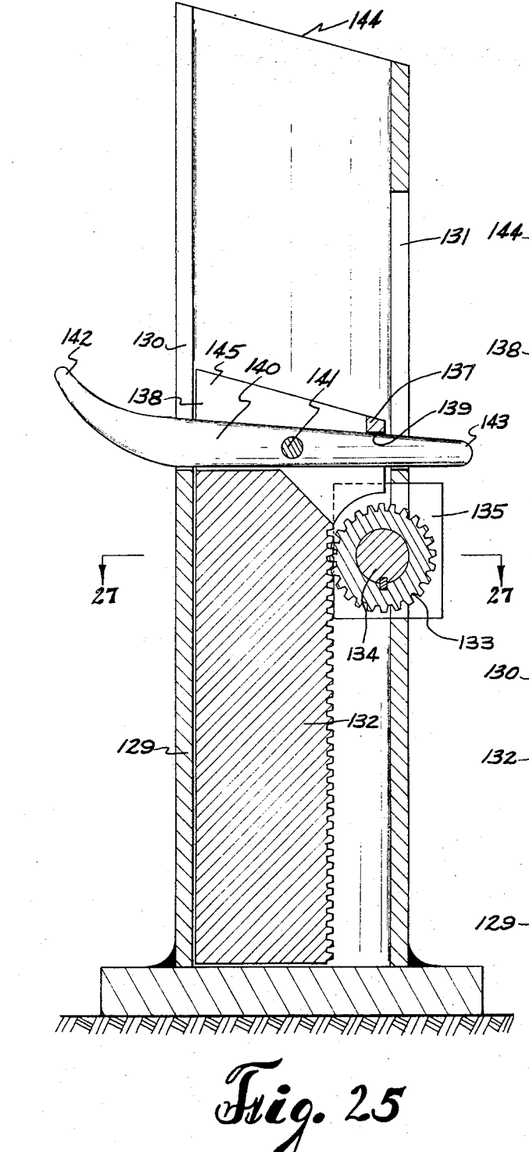
FIG. 25 is a vertical sectional view of one of the rack-and-pinion type transfer units for transferring pipe sections between the auxiliary pipe racks and the primary pipe racks, the transfer element being shown in the down or inactive positions.
Figure 26:
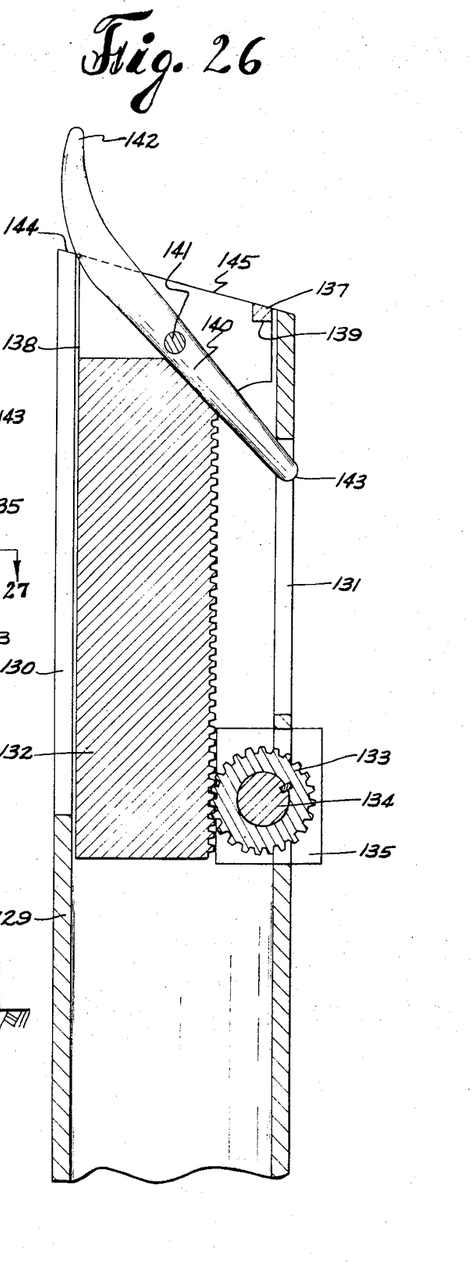
FIG. 26 is a view similar to FIG. 25 showing the transfer elements in the raised or active pipe transferring positions.
Figure 27:
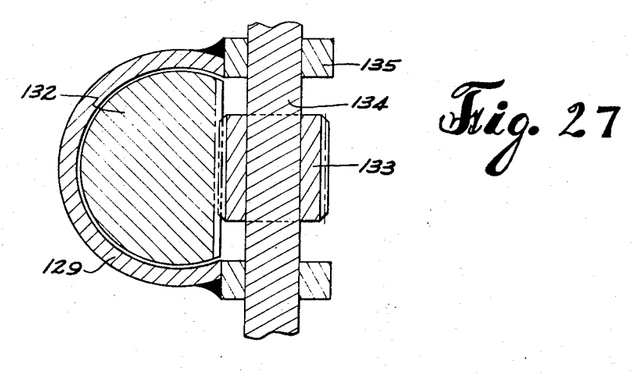
FIG. 27 is a cross-sectional view taken on line 27—27 of FIG. 25.

An aligning jack, designated generally by the letter L, and shown in greater detail in FIGS. 21 and 22, effectively connects travelling block B to power swivel J to effect relative angular movement therebetween to enable alignment of spear K (or sub $K_1$) with pipe sections P as the latter enter the derrick in a sloping or non-vertical position through clamp E. As best seen in FIGS. 21 and 22, jack L comprises a cylinder 100 closed at its upper end by a head 101 carrying an upstanding flat lug 102 pierced by a bolt hole 102a. The lower end of cylinder 100 encloses a dual or compound piston comprising a hollow piston 103 carrying a head 104 slidable in the bore of cylinder 100 and a solid piston 105 carrying a head 106 slidable in the bore of hollow piston 103. Spaced seals 107 and 108 are provided on head 104 to seal between cylinder 100 and hollow piston 103, defining a pressure cylinder 109 therebetween in communication with a fluid pressure supply and vent pipe 110. Spaced seals 111 and 112 are provided on head 106 to seal between pistons 103 and 105 defining a pressure cylinder 113 therebetween in communication with a fluid pressure supply and vent pipe 114. A pressure fluid connection 115 is provided through head 101 communicating with the interior or cylinder 100. By means of these several pressure fluid connections to the several cylinders it will be evident that the jack may be extended or retracted as required.

Lug 102 is adapted to be hingedly secured to a mating lug 116 secured to one side of travelling block B (FIGS. 11 to 14) and the lower end of piston 105 is adapted to be hingedly secured by means of a hinge pin 117 to a laterally extending arm 118, which is fixedly secured to a portion of the casing of power swivel J.

Figure 14:
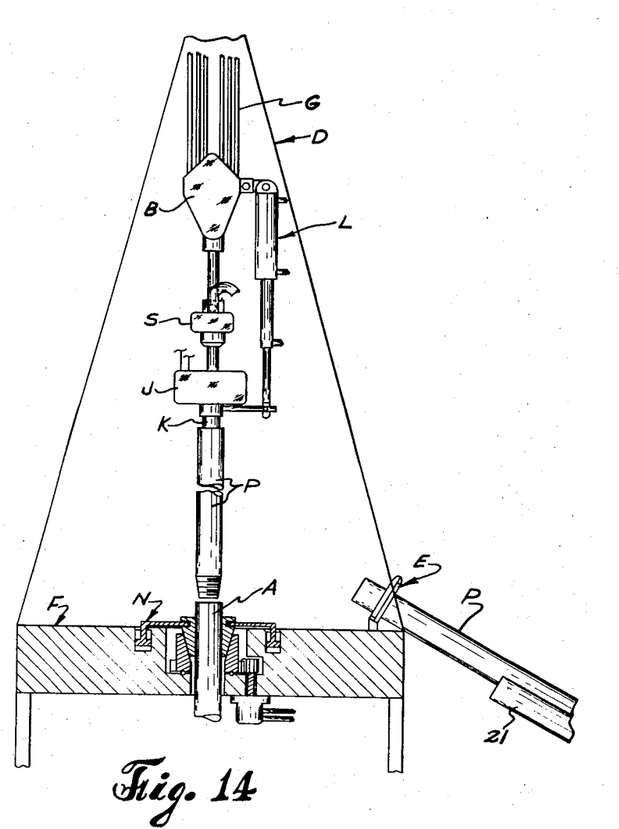

As will be evident from the foregoing, jack L will be operable to swing power swivel J and spear K about pivot M to any angle necessary to align spear K with the incoming end of pipe section P (FIG. 12), so that the spear may be inserted in the bore of the pipe section (FIG. 13) and connected thereto to enable the pipe section to be pulled up into the derrick and aligned with upper end of the pipe string A in place in the well bore and projecting upwardly above the derrick floor (FIG. 14). Pipe string A will be releasably supported in conventional automatic slips N, the details of which do not form a part of this invention.

FIGS. 23 to 27 illustrate a supplementary pipe storage and supply system adapted for arrangement alongside one or both of pipe racks 10, for supplying sections of pipe in addition to those which can be stored in a single layer on each of the pipe racks, as where the latter quantity of pipe is insufficient to meet the total depth requirements of the well being drilled. Such supplementary storage systems are most often necessary where the pipe is relatively large diameter casing for which the capacity of pipe racks 10 may be substantially limited.

The supplementary system includes a rack, designated generally $R_1$, comprising transverse floor beams 120 pivotally connected at their inner ends by pivots 122 to inner supporting posts 123, the rearward or outer ends of the floor beams being supported on outer posts 124 carrying vertically adjustable screw caps 125 operable to tilt the floor beams toward or away from their inner ends. Additional sections of pipe P may be stored on rack $R_1$ in several layers (FIG. 24) separated by transverse spacer bars 126 which will provide level surfaces over which the pipe sections will roll readily toward or away from the inner edge of the rack depending on the tilt angle of rack $R_1$.

Transfer means for transferring pipe sections from rack $R_1$ to the adjacent rack 10 is provided between the outer longitudinal edge of the latter and the inner longitudinal edge of rack $R_1$ and comprises a plurality of longitudinally spaced, vertically disposed tubular posts designated generally by the numerals 127, mounted on foot plates 128.

Each of the posts 128 comprises a tubular shell 129 open at its upper end and having a vertical slot 130 in the portion adjacent the inner end of rack $R_1$ extending from about the midpoint of the shell to its upper end. A second vertical slot 131 is provided in the opposite portion of the shell wall in registration with slot 130 but closed at its upper end. A toothed rack 132 is disposed for vertical movement inside shell 129 and is driven by a pinion 133 which is mounted on a horizontally disposed drive shaft 134 journalled in bearings 135 and driven by a motor 136 of any conventional design, which may be powered by electricity, hydraulic fluid or air. Shaft 134 is connected to the several pinions 133 so that the racks in the several posts will be raised and lowered in unison during operation of the device.

Mounted on the upper end of each rack 132 is a tubular cap 137 having an open vertical slot 138 registering with slot 130 and an opposite slot 139 closed at its upper end and registering with slot 131. A pick-up bar 140 extends transversely through cap 137 and is pivotally mounted therein on a cross pivot pin 141. One end of bar 140 extends through slots 138 and 130 and terminates in an upwardly curved finger 142 which projects externally of shell 129. The opposite end 143 of bar 140 extends through slots 139 and 131 and projects externally of shell 129. The opposite end 143 of bar 140 extends through slots 139 and 131 and projects externally of shell 129. The upper ends of shell 129 and cap 137 are cut off at an angle to form the respective end surfaces 144 and 145 which slope downwardly toward the outer edge of rack 10.

OPERATION OF THE SYSTEM

Figure 2:
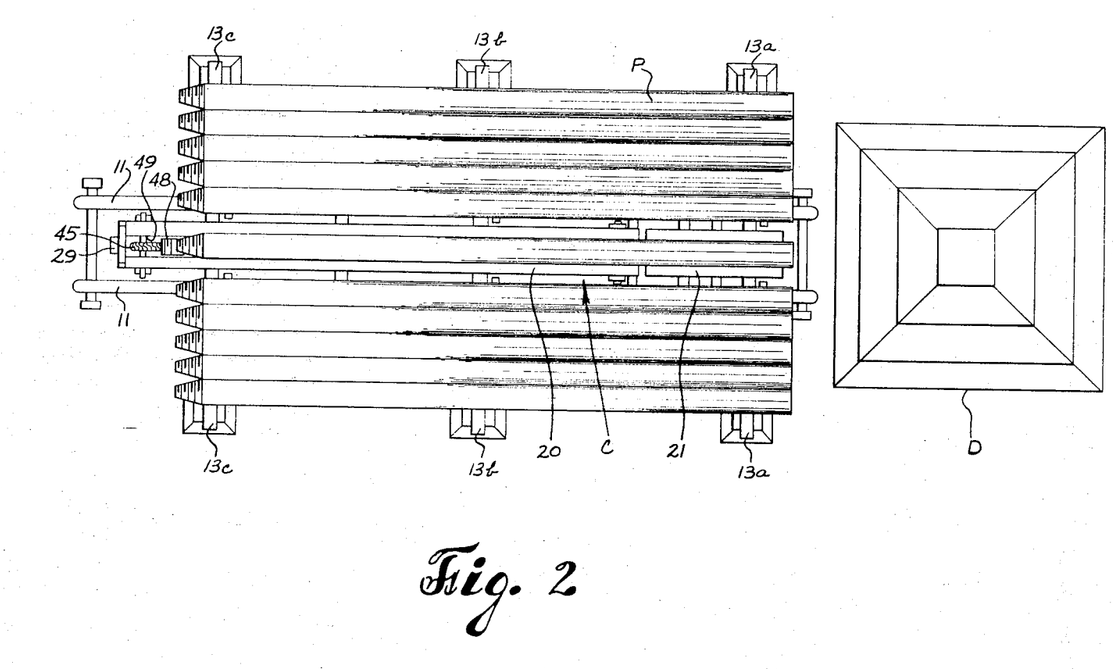
FIG. 2 is a plan view similar to FIG. 1 showing the racks with pipe sections in place thereon, one pipe section being shown loaded on the conveyor preparatory to being advanced to the derrick.
Figure 3:
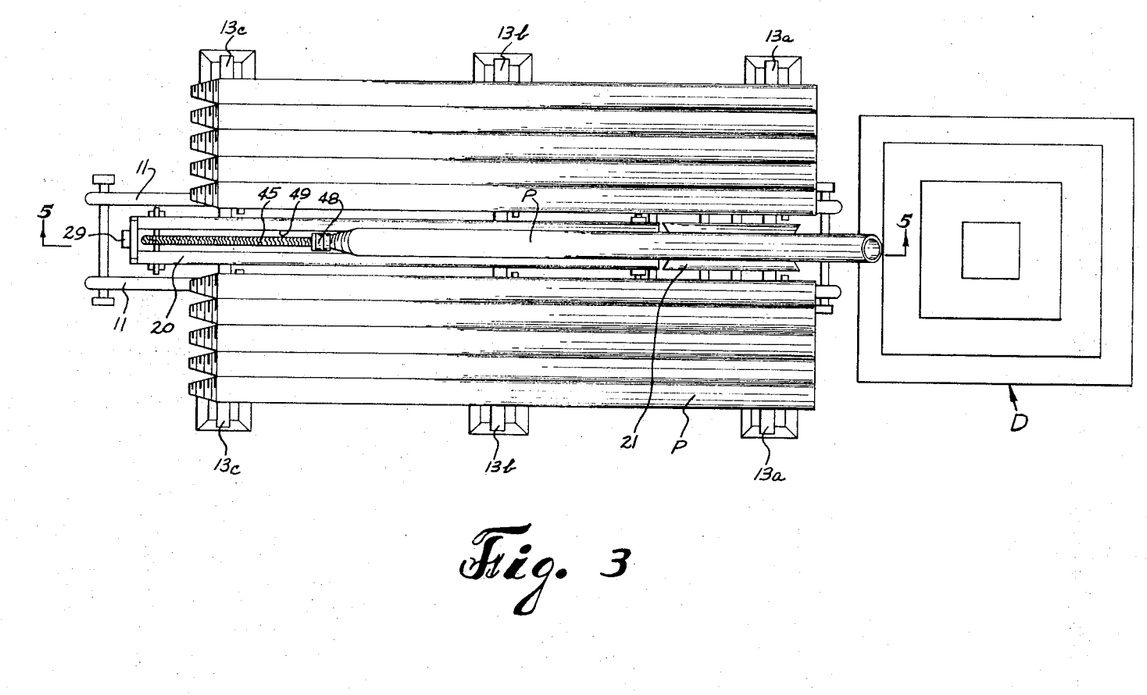
FIG. 3 is a plan view similar to FIG. 2, showing a later stage in advancement of a pipe section to the derrick.

In accordance with one method of operation of the system, pipe racks 10 loaded with pipe sections P as seen in FIG. 2 will be tilted downwardly toward conveyor means C to allow the pipe sections to roll by gravity to the conveyor section when detents 61 are released. Initially both sections 20 and 21 of the conveyor means will be in the horizontal level position (FIGS. 4A and 4B) and pusher lug 48 will be in its retracted position as seen in FIG. 4A. Actuation of jacks 31 and 32 will be effected to cause the sections of the conveyor to tilt about their longitudinal axis bringing fingers 66 into downward contact with lips 63 of the detents, depressing the lips of the detents and releasing the first section of pipe P, which will then roll on to cradles 27 and 28. At the same time the rotation of detent 61 will raise its rearward end 63a into the path of movement of the next section of pipe P holding it and those behind it temporarily against forward movement. Further actuation of jacks 31 and 32 will be effected to return the cradle to its centered position( FIG. 8) with the rearward end of the pipe section in engagement with pusher lug 48. When the cradle is returned to the centered position, finger 66 will have released lip 63 allowing the detents to be rotated back to their original positions releasing the next section of pipe P to roll down into position for subsequent transfer to the conveyor.

Figure 12:
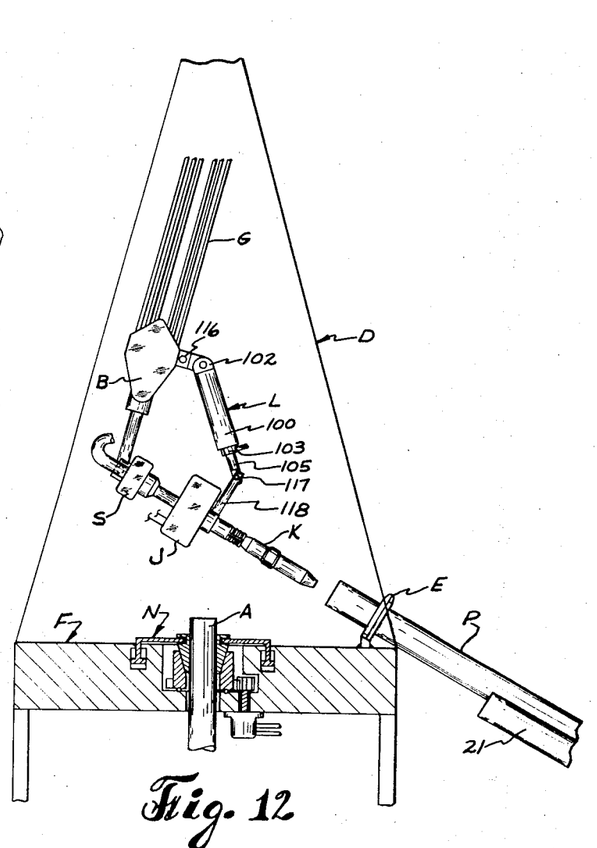
Figure 13:
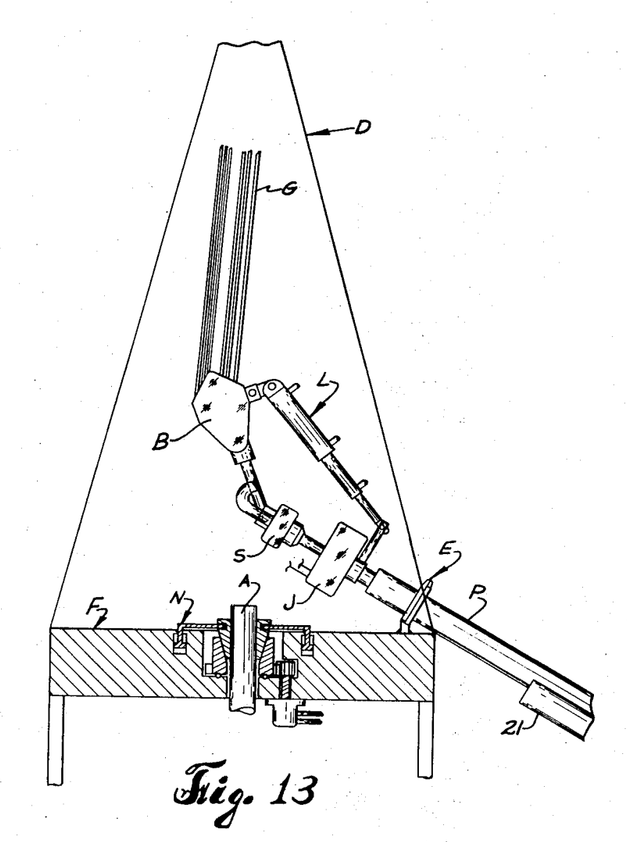

With the pipe section in centered position on the conveyor means, pusher lug 48 will be actuated by means of motor 46 to move the pipe section P forwardly over conveyor sections 20 and 21. At the same time, the latter section will be raised by operation of jack 52 to elevate the forward end of the pipe section as pusher lug 48 moves it forwardly over the conveyor sections. The elevation of the forward end of the pipe section P (FIG. 5) will raise it above the level of derrick floor F and project it between the jaws of clamp E, the latter, whether of the manually-operated form (FIGS. 15 to 17) or the power-operated form (FIGS. 18 to 20), will then be closed about the pipe section as a back-up while travelling block B is lowered and jack L operated to align spear K axially with pipe section P (FIG. 12). As the spear is introduced into the end of pipe P, operation of power sub J will secure the spear to the pipe section by relative rotation, clamp E serving as a back-up. With the spear in place in pipe section P, clamp E may be opened and operation of the hoist system employed to swing the pipe section into the derrick. Jack L will be actuated to permit the suspended pipe section and the power sub and intervening connections to the travelling block to be straightened to a vertical position above the upper end of pipe string A in place in the well (FIG. 14). Thereupon the pipe section will be lowered until its threads are inserted into the box of the upper end of pipe string A and made up therein by appropriate rotation effected by means of the power swivel. Pipe string A will be held stationary to permit this operation by the power slips N in the well-known manner. When the pipe section has been made up into the well string, the power slips will be released and operation of the hoist mechanism effected to lower the string by a distance corresponding to the length of the added pipe section P. Where the added section is to be drilled off, power swivel J may be operated in the known manner to rotate the entire drilling string, power slips and having been raised to release the string for rotation.

The just described series of operations will be repeated as additional pipe sections P are inrtoduced into the drilling string. The pipe sections may be taken alternately from each of the racks C or may be taken in sequence from one side until the rack on that side is emptied and then in sequence from the rack on the opposite side of the conveyor system.

As a pipe section is hauled up into the derrick off of forward section 21 of the conveyor means, forward section 21 will be lowered to the position level with conveyor section 20 and pusher lug 48 retracted into position to receive the next section of pipe P and the sequence of operations may be repeated as may be required either to return pipe withdrawn from the well or to add pipe as the drilling proceeds.

The sequence of operations is reversed when withdrawing the pipe from the well. It will introduced evident that as a section is removed from the drilling string, cooperating movements of the hoist mechanism and jack L will be effected to direct a pipe section P through clamp E to forward section 21 of the conveyor means. With clamp E secured about the pipe in the position seen in FIG. 13, spear K may be released and withdrawn from the pipe section, whereupon retraction of pusher lug E will allow the removed section of the pipe to slide down forward section 21 of the conveyor means on to rearward section 20 to a position opposite one of the pipe racks. Forward section 21 will be lowered to the level position and by actuation of jacks 31 and 32, the pipe section may be returned to the pipe racks C which in this situation will have been tilted so that the pipe section tends to roll down toward the outer edge of the pipe rack.

This sequence of operations for removing the pipe from the well will be continued with the sections delivered first to one or the other side of the racks as may be desired until all of the pipe has been removed from the well.

Where racks C do not have sufficient capacity to hold all of the pipe required to attain the desired depth in the well, storage racks $R_1$ may be employed and additional pipe sections delivered to racks C by actuation of the rack and pinion device illustrated in FIGS. 24 to 27, inclusive. Where the storage racks are thus employed, they will be tilted downwardly toward racks C and by appropriate actuation of the rack and pinion mechanism previously described, fingers 140 will be caused to pick up the pipe section immediately adjacent casings 129 and raise them to the top of the casings, whereupon pick-up bars 140 will be tripped by engagement of outer ends 143 with the upper walls of slots 139 to deliver the pipe section on to surfaces 144 of the casings, whereupon the pipe section will now be free to roll by gravity on to the rack bars forming pipe rack C on which the pipe will now roll to a position to be picked up by the conveyor cradle, in the manner previously described.

As many sections of pipe P can thus be delivered from racks $R_1$ as may be required to make up the drilling string required for the drilling of the well.

To return the pipe sections to storage rack $R_1$ the sections will first be returned to racks C as previously described, the racks being tilted downwardly toward the outer edges and the pipe sections thus deposited on rack C will roll by gravity downwardly along the racks and thence on to racks $R_1$. The latter will also be tilted downwardly toward their outer edges to allow the pipe sections to be stored thereon successively as received from racks C.

The system as described may be employed to handle either conventional drill pipe as the drilling string or when using casing as the drill pipe. IN the former case, spear K will be replaced by the connector $K_1$ (FIG. 10A), which is adapted for direct threaded connection into the boxes of the drill pipe sections. Otherwise the operations are substantially the same as has been previously described, which was applicable primarily to the handling of casing.

It will be understood that various changes and modifications may be made in the illustrative embodiments heretofore described within the scope of the appended claims but without departing from the spirit of this invention.

What I claim is:

1. A pipe handling system for delivering pipe sections to a well drilling derrick, comprising:
   a. pipe rack means for horizontally supporting a plurality of pipe sections in parallel relation to each other and pivotable about its longitudinal axis;
   b. elongate conveyor means disposed alongside said rack means and tiltable about its longitudinal axis to receive pipe sections from said rack means;
   c. dual-ended, integral, pivoted detent means having one end initially holding successive ones of said pipe sections on said rack means and releasable in response to tilting of said conveyor means to free said pipe sections for rolling movement from said rack means onto said conveyor means, the opposite end of said detent means being simultaneously interposed into holding position with the pipe section immediately succeeding that being released; and d. means mounted on said conveyor means for advancing the received pipe sections into the derrick.

2. A pipe handling system according to claim 1 wherein said conveyor means comprises articulated rearward and forward sections pivotally connected to permit vertical angular movement of the forward section relative to the rearward section.

3. A pipe handling system according to claim 2 including:
   a. power-operated means for tilting said conveyor means; and
   b. power-operated means for effecting said vertical angular movement of said forward conveyor section.

4. A pipe handling system according to claim 1 including power-operated means for tilting said conveyor means.

* * * * *